Aug. 8, 1961  S. A. WOLFE  2,994,933
GROMMET
Filed April 4, 1956
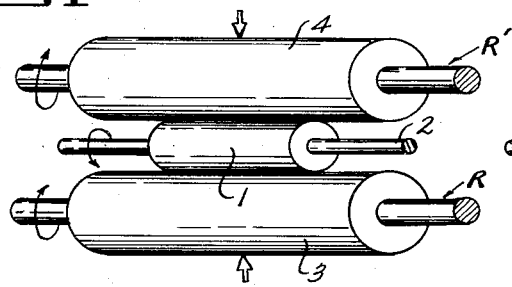
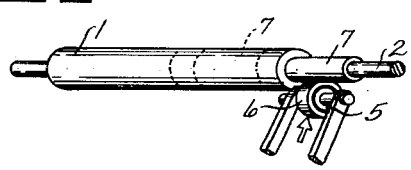
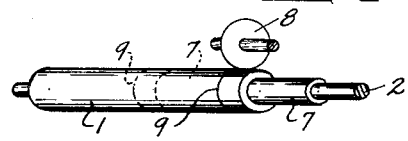
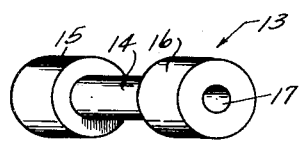
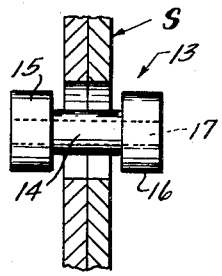
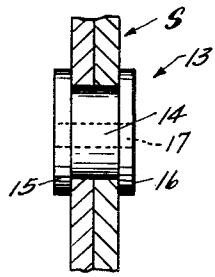
INVENTOR.
SHEEMON A. WOLFE
BY
HIS ATTORNEY

United States Patent Office 2,994,933
Patented Aug. 8, 1961

2,994,933
GROMMET
Sheemon A. Wolfe, 2422 Salem Ave., Dayton, Ohio
Filed Apr. 4, 1956, Ser. No. 576,022
8 Claims. (Cl. 24—141)

This invention relates to grommets of an improved nature which are capable of functioning as fasteners and a simple and economical method for manufacturing them. The grommet as provided by the invention is fabricated of vinyl tubing having the property of plastic memory. It is formed to provide advantageous insulating and shock absorbing characteristics and to function efficiently either as a grommet or a fastening element, or in both capacities. The subject invention was particularly developed for application in structures where conditions of heat or chemical influence might cause deterioration of ordinary grommets or where shock or mechanical vibration might cause loosening thereof. The grommet provided is essentially self sealing.

Much time and money has been invested in efforts to develop plastic grommets and fasteners which could be both easily and economically applied and efficiently utilized. A particular problem in the art has been to effect such a plastic element which would not require extensive handling in application yet would afford a gentle, positive sealing thereof to the elements to which it would fasten. This is of particular importance where the grommets are to be applied to non-metallic materials. The use of metal grommets or fasteners is objectionable in many instances for chemical or physical reasons.

Plastic grommets and fasteners previously developed have been fabricated of rigid or powdered plastic or composite plastic and rubber materials and they generally require the use of both heat and pressure facilities in the fabrication and application thereof. The fastening of these prior art devices and their general use creates problems related to both cost and efficiency.

The present invention provides a simply and economically fabricated grommet which is cold formed and so devised of vinyl tubing to utilize the plastic memory property thereof. The grommet obtaining can function equally as efficiently as a fastener. The use of vinyl tubing in effecting the grommet enables a simple and continuous economical production thereof. In applying the product of the invention to a structure no pressure facility is required, merely heat which induces a self sealing permanent fixing thereof to the structure. The improved plastic grommet provides complete insulating and shock absorbing characteristics. Its tubular nature and generally uniform configuration enables it to be easily handled and efficiently applied in permanently fixed fashion with a minimum of effort.

An object of the invention to to provide an improved plastic grommet which is capable of functioning as a fastener equally as well.

Another object of the invention is to provide a simple and economical method of fabricating grommets of plastic tubing.

A further object of the invention is to provide an improved cold formed plastic grommet, capable of functioning equally as well as a fastener, which merely requires positioning and application of heat thereto to induce a self sealing thereof to a structure to which it is applied.

An additional object of the invention is to provide an improved plastic grommet or fastener the respective portions of which have a uniform cross-sectional configuration, which is fabricated of vinyl tubing having the property of plastic memory.

Another object of the invention is to utilize the specific properties of vinyl plastic in fabricating an improved insulating and shock absorbing grommet for use in areas where heat or chemical conditions might cause deterioration of ordinary grommets or where shock or vibration conditions might cause loosening thereof, the grommet so provided being capable of functioning as a self sealing fastener on application of heat alone thereto.

Another object of the invention is to provide an improved cold formed plastic grommet having the property of plastic memory and an interior surface which will remain dimensionally constant in cross-section on application of heat to utilize the plastic memory of the grommet.

A further object of the invention is to provide an improved plastic grommet capable of functioning as a fastener and possessing the advantageous structural features, the inherent meritorious characteristics, and the mode of operation and application herein described.

With the above primary and other incidental objects in view, as will more fully appear in the specification, the invention intended to be protected by Letters Patent consists of the features of construction, the parts and combinations thereof, and the mode of operation and fabrication thereof as hereinafter described or illustrated in the accompanying drawings, or their equivalents.

Referring to the drawings wherein is found the preferred but obviously not necessarily the only form of embodiment of the invention, FIG. 1 illustrates, in generally schematic fashion, the initial step in fabricating plastic grommets as provided by the invention, consisting of cold reducing and elongating vinyl plastic tubing by rolling thereof.

FIG. 2 shows the vinyl plastic tubing shown in FIG. 1 as reduced by the rolling operation illustrated therein.

FIG. 3 schematically shows the reduced and elongated tubing resulting from the operation shown in FIG. 1 being further reduced at uniformly spaced intervals by a single small roller from one end to the other in successive fashion.

FIG. 4 schematically illustrates the cutting or clipping of tube sections of uniform configuration as further reduced in the manner of FIG. 3 to provide grommets or fasteners in accordance with the invention.

FIG. 5 is a perspective view of the grommet or fastener resulting in the cutting operation shown in FIG. 4.

FIG. 6 shows a modification of the grommet or fastener of FIG. 5 which can be effected in a similar fashion.

FIG. 7 shows the grommet of FIG. 6 as positioned through an aperture in a panel structure preliminary to application of heat thereto.

FIG. 8 shows the grommet of FIG. 7 in its sealing relation to the panel shown therein as provided by the mere application of heat thereto.

The invention can be best described with particular reference to the accompanying drawings. The grommet or fastener is to be formed of vinyl tubing which has the inherent property of plastic memory. A section of the vinyl tubing 1 is placed over a rigid mandrel 2. This mandrel has an external diameter generally conforming to the internal diameter of the tubing 1 since the internal diameter of the tubing is to be maintained throughout the cold working thereof as originally provided. The mandrel 2 and the tubing 1 mounted thereon are driven in rotatory fashiond by suitable motor means connected with the mandrel. The motor means is not shown in the drawings since it forms no particular detail of the invention.

Roller elements 3 and 4, respectively mounted in fixed relation to rods R and R', are arranged in diametrically opposed relation to either side of tubing 1. The rods R and R' are rotatably supported by suitable means so as to provide adjustment of the rollers 3 and 4 relative the tubing 1. Motor means (not shown) are connected to the roller elements 3 and 4 for simulataneous drive thereof in a direction opposite the direction of rotation of the tubing 1. Noting FIG. 1 of the drawings, the rollers 3 and 4 are advanced continuously inward of the tubing 1 on rotation thereof to cold work the tubing and effect a reduction in its external diameter and an elongation thereof in the process, as indicated in FIG. 2 of the drawings. The internal diameter of the tubing 1 is maintained uniform and constant by the use of the rigid mandrel during this cold working thereof. It is noted that the rollers 3 and 4 as well as the tubing 1 are driven at a uniform speed to minimize friction and resultant heat in the cold working of the tubing. The details of the drive and support means for the rollers 3 and 4 have not been set forth since in and of themselves they constitute no part of the invention and they can be readily provided in suitable fashion by one versed in the art.

The tubing 1 having been cold worked by rollers 3 and 4 is reduced in external diameter and elongated as shown schematically in FIG. 2 of the drawings. The tubing is then subjected to the application of a small roller 5 having a free rotating outer surface 6. The roller 5 is sequentially applied to the rotating tubing 1 from one end to the other thereof at uniformly spaced intervals or sections 7, the roller being advanced inwardly of the tubing to further cold work and reduce the external diameter of the tubing at the successive spaced sections 7. Noting FIG. 4 of the drawings, as a section 7 at the end of the tubing 1 is further reduced and elongated by roller 5, a cutter 8 is then advanced into the rotating tubing 1 at 9 spaced from the further reduced section 7 thereof to provide a grommet or fastener 10 as shown in FIG. 5 of the drawings. As each successive interval or section 7 is reduced, the cutter 8 is operated and severs an identical grommet 10 from the tubing 1.

The element 10 is tubular in nature and cylindrical in form. It is cold formed of vinyl plastic tubing to be reduced in external diameter throughout while its internal diameter is maintained as originally provided. One end portion 11 of the element 10 is further reduced in external diameter relative the other end portion 12 thereof. The cross-sectional configuration of each of the portions 11 and 12 of the grommet is uniform throughout the length thereof making the element easy to handle and manufacture. Of course, the element 10 is elongated in the process of the cold working thereof. The grommet so provided has the property of plastic memory since it has been cold formed of vinyl tubing having such characteristic. To apply the grommet or fastener 10, it need merely be positioned to have the further reduced end 11 thereof inserted through the aperture provided in the structural means to which it is to secure to establish the relatively enlarged portion 12 adjacent the outer surface of such structural means. By then merely applying heat to the element 10 either through the handling means or other suitable means, the element 10 will radially expand and longitudinally contract without need of other means than heat in the process. As this occurs, the sections 11 and 12 of the grommet radially expand and longitudinally contract. The inner portion of section 11 of the grommet, adjacent the relatively enlarged portion 12 thereof, fills the aperture and seals to the structure defining the aperture while the portion 12 and the outer end of portion 11 radially expand as they longitudinally contract to seal to the outer surfaces of the structure to which the element 10 is applied. In the natural contraction of the grommet or fastener 10 due to the plastic memory effect provided therein, the radially expanded ends thereof seal and fix to the outer surfaces of the structure to which it applies in a firm positive manner not susceptible to loosening due to shock or vibration.

The seal of the grommet or fastener 10 is not only positive but gentle due to the nature of the plastic material. And the grommet has full insulating and substantial chemical and heat resistant characteristics. It is simple to apply and requires no compression facilities. Due to its generally uniform configuration it is easy to handle and simple to manufacture. The method for manufacture schematically illustrated and described herein is but one of the methods by which the improved grommet or fastener can be effected and is presented as a preferred method of fabricating the item constituting the subject invention.

The preferred modification of the grommet which is capable of functioning as a fastener as provided by the invention is shown in FIG. 6 of the drawings. This element 13 is also tubular in nature and preferably cylindrical in form as illustrated. It may be cold formed of vinyl tubing having the property of plastic memory in the manner of the modification of FIG. 5 of the drawings, with more or less minor variations which are believed obvious and to require no further detailed description. It is noted here also that heat is avoided in the forming process so that no permanent set of any appreciable nature occurs. The grommet resulting has the inherent property of plastic memory. The grommet or fastener 13 is formed to provide a central cylindrical portion 14 of uniform cross-section which has been twice reduced in fabrication to have an external diameter less than that of the once reduced end sections 15 and 16 of the element which are also of uniform cross-sectional configuration. The internal diameter of the element 13 is uniform throughout and as originally provided in the vinyl tubing employed in the fabrication of the grommet. The purpose of this is to insure the diameter of the aperture 17 through the grommet and proper access therethrough when required. Again, in the application of this form of tubular grommet or fastener to structural means, it need merely be positioned, as shown in FIG. 7 of the drawings, to have its end portions 15 and 16 adjacent to the outer surfaces of the structure S to which it is applied. The further reduced portion 14 of the element 13 is thus positioned within the aperture in the structure through which the element is applied and heat is introduced to the element through the positioning means therefor or other suitable means. On application of the heat, a radially expanding and a longitudinally contracting action of the element 13 takes place as the plastic memory property thereof functions. As can be seen in FIG. 8 of the drawings, a complete and positive seal and fastening of the element 13 to the structural means S about the aperture therein and in containing relation to the outer surfaces thereof results. The dimensions of the grommet must of course conform to the requirements and the manner of its application.

The simplicity and ease of application of the grommet or fastener provided is believed obvious. The advantageous construction thereof affords an efficient and economical method of production thereof and enables a desirable element which may be employed where blind fastening may be required.

It is noted that the expression "cold formed" is employed herein to define characteristics of an improved grommet as provided by the invention. As particularly related to a grommet of material having the property of plastic memory, this expression defines a grommet the fabrication of which has been accomplished without application of heat to thereby eliminate the presence of a permanent set therein. By this means, the true plastic memory of the grommet is preserved.

From the above description it will be readily apparent that there is thus provided a device of the character described possessing the particular features of advantage before enumerated as desirable, but which obviously is susceptible of modifications in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown but that the means and construction and method of fabrication thereof herein disclosed constitute the preferred form of several modes of putting the invention into effect, and the invention is therefore claimed in any of its forms or modifications within the legitimate and valid scope of the appended claims.

Having thus described my invention, I claim:

1. A plastic grommet capable of serving as a fastener comprising a cylindrical body of plastic which is tubular and has the property of plastic memory, said body being elongated and imbued with the properties of plastic which has been cold formed, said body having a uniform internal diameter throughout, the portion of said body defining said internal diameter having the property of being dimensionally constant in cross-section on application of heat to said body to exercise its property of plastic memory.

2. A plastic grommet capable of serving as a fastener comprising, a relatively elongated body of plastic having the property of plastic memory and a uniform aperture therethrough longitudinally thereof, the outermost portions of said body having the properties of plastic which has been cold formed, at least one portion of said body being uniformly reduced in cross-section relative the remainder, said remainder being uniform in cross-section and external configuration and the interior surface of said body defined by the aperture therethrough having the characteristics of being dimensionally constant in cross-section on application of heat to exercise the plastic memory of said body, said body otherwise responding to heat to radially expand and longitudinally contract to seal itself gently and firmly to means to which it is applied.

3. A plastic grommet capable of serving as a fastener comprising a plastic relatively elongated body having an axial aperture therethrough, said body having the character of cold formed plastic and the property of plastic memory, one end of said body being of reduced but uniform cross-section, the other end of said body having a uniform cross-sectional configuration and the portion of said body defining the aperture therethrough having the property of being dimensionally constant in cross-section on application of heat whereby on application and heating of said body it will radially expand and longitudinally contract to automatically fix itself in position and maintain the cross section of said aperture in the process facilitating handling and application of said body.

4. A plastic grommet capable of serving as a fastener comprising a plastic relatively elongated body having an axial aperture, said body having the character of cold formed plastic and plastic memory, the central portion of said body being reduced in cross-section with respect to adjacent body portions, the respective portions of said body being uniform in cross section and the surface section of said body defining said aperture having the property of being dimensionally constant in a cross-sectional sense on application of heat to exercise the plastic memory of said body whereby, on application of heat and heating of said body, in the process it will seek its original configuration in a self fixing balanced fashion and automatically self seal to the structure to which it is applied.

5. A plastic grommet capable of serving as a fastener comprising a uniformly tubular body of vinyl plastic having the property of plastic memory elongated in an axial sense and imbued with the characteristics of a cold formed plastic, the internal configuration of said body being fixed and substantially constant throughout, the section of said body defining said internal configuration having the property of being dimensionally constant in a transverse sense on application of heat to said body to exercise its plastic memory, the central section of said body being uniform in cross-section and the adjacent body sections being similarly uniform but larger in cross-section, whereby on application of said body with heat it will fix itself in self sealing fashion to opposite surfaces of structure, the dimensional constancy of the internal configuration of the body facilitating its application.

6. A grommet comprising a body having the character of cold formed plastic, said body having an aperture therethrough and at least a central portion relatively elongated in one sense and reduced in another sense, the portion of said body immediately defining the aperture being of a character to be dimensionally constant in cross-section on application of heat, and said body otherwise having the property of being responsive to heat to externally expand in one sense and contract in a sense at right angles thereto for effecting a self locking thereof to a structure to which it is applied.

7. A plastic grommet capable of serving as a fastener comprising a tubular body of cold formed plastic having the property of plastic memory, at least one longitudinal portion of said body being uniformly reduced in external dimension relative the remainder and relatively elongated, the remainder of said body having a uniform cross sectional configuration and the portion of said body defining its interior having the property of being dimensionally constant in cross section on application of heat to exercise the property of plastic memory inherent in said body whereby on location and mere heating of said grommet through the medium of its handling means, said body will radially expand and longitudinally contract to fix itself to a structure yet maintain the cross sectional dimension of its interior.

8. A plastic grommet capable of serving as a fastener comprising a body of plastic having the property of plastic memory, said body being tubular in nature, a central portion of said body being elongated and reduced in external diameter relative the remainder and having the properties of plastic which has been cold formed, the portion of said body defining its interior having the characteristic of being dimensionally constant in cross section of application of heat to exercise the property of plastic memory of said body, the end portions of said body being relatively larger in external diameter than said central portion and having uniform cross sectional configuration.

References Cited in the file of this patent
UNITED STATES PATENTS

| | | |
|---|---|---|
| 2,458,152 | Eakins | Jan. 4, 1949 |
| 2,510,693 | Green | June 3, 1950 |
| 2,620,513 | Cryor et al. | Dec. 9, 1952 |
| 2,671,889 | Vickery | Mar. 9, 1954 |
| 2,719,324 | Gray et al. | Oct. 4, 1955 |
| 2,756,624 | Austin | July 31, 1956 |
| 2,759,390 | Edwards | Aug. 21, 1956 |